United States Patent [19]

Mattox

[11] Patent Number: 4,660,670
[45] Date of Patent: Apr. 28, 1987

[54] WING-IN-GROUND EFFECT AIR CUSHION VEHICLE

[76] Inventor: Darryl F. Mattox, Lot 14, Tomago Road, Tomago, N.S.W. 2322, Australia

[21] Appl. No.: 859,213

[22] Filed: May 2, 1986

Related U.S. Application Data

[63] Continuation of Ser. No. 526,805, Aug. 26, 1983, abandoned.

[30] Foreign Application Priority Data

Sep. 7, 1982 [AU] Australia .................................. PF5732

[51] Int. Cl.$^4$ ................................................ B63B 1/38
[52] U.S. Cl. .................................. 180/117; 114/67 A; 180/121; 180/126; 244/23 R; 244/100 A; 244/101
[58] Field of Search ............... 180/126, 127, 128, 116, 180/121; 114/67 A; 244/12, 23 R, 23 B, 29, 101, 100 A

[56] References Cited

U.S. PATENT DOCUMENTS

| | | | |
|---|---|---|---|
| 3,181,636 | 5/1965 | Cockerell | 180/118 |
| 3,181,638 | 5/1965 | Cockerell | 180/118 |
| 3,193,215 | 7/1965 | Dunham | 244/12.1 |
| 3,414,077 | 12/1968 | Earl | 244/12.1 X |
| 3,481,423 | 12/1969 | Winter | 180/127 X |
| 4,227,475 | 10/1980 | Mattox | 18C/125 X |
| 4,350,107 | 9/1982 | Mattox | 114/67 A |

FOREIGN PATENT DOCUMENTS

| | | | |
|---|---|---|---|
| 805537 | 2/1969 | Canada | 180/128 |
| 1247144 | 8/1967 | Fed. Rep. of Germany | 114/67 A |
| 2422535 | 12/1979 | France | 180/128 |
| 1072732 | 6/1967 | United Kingdom | 180/128 |
| 1075868 | 7/1967 | United Kingdom | 180/127 |
| 1075745 | 7/1967 | United Kingdom | 180/118 |
| 1087379 | 10/1967 | United Kingdom | 180/127 |
| 1123383 | 8/1968 | United Kingdom | 180/128 |
| 2080224 | 2/1982 | United Kingdom | 180/117 |

Primary Examiner—John J. Love
Assistant Examiner—Mitchell J. Hill
Attorney, Agent, or Firm—Stevens, Davis, Miller & Mosher

[57] ABSTRACT

An air-cushion vehicle of the type having a flat rigid platform with rigid longitudinal walls attached to the platform. In such an air-cushion vehicle a plurality of transverse trough-shaped skirts are provided so as to form a space bounded by the skirt and the platform which, when supplied with higher pressure air, serves to provide an air cushion chamber. The vertical height of the air cushion chamber can be varied in accordance with the present invention by extending or retracting the material of the trough-shaped skirts by way of an adjustment mechanism. In a preferred embodiment, the adjustment mechanism comprises a skirt bar attached to each of two longitudinal edges of the skirt and a mechanism for moving the skirt bars sideways closer together or further apart, thus varying the skirt's vertical dimension.

5 Claims, 12 Drawing Figures

WING-IN-GROUND EFFECT AIR CUSHION VEHICLE

This application is a continuation of application Ser. No. 526,805, filed 08/26/83 now abandoned.

BACKGROUND OF THE INVENTION

1. Field of the Invention

This invention relates to air-cushion vehicles, and more particularly to such a vehicle which is fully operational and efficient in at least three different modes of operation, namely, as a waterborne air-cushion vehicle, as what is termed a wing-in-ground effect vehicle, and as a fully aerodynamic aircraft.

2. Discussion of the Prior Art

The present invention constitutes a modification of, or improvement in, those vehicles described and claimed in U.S. Pat. No. 4,227,475 issued Oct. 14, 1980 and U.S. Pat. No. 4,350,107 issued Sept. 21, 1982 to the present inventor, which will be referred to hereinafter as the parent specifications.

SUMMARY OF THE INVENTION

In these parent specifications, the vertical dimensions of the flexible skirts are fixed or remain constant when not subjected to outside forces, and it is consequently an object of this invention to provide a flexible skirt in which the vertical dimension may be adjusted by remote control while the vehicle is operating. Such adjustable skirts permit the provision of a vehicle that is fully operational and efficient in at least three different modes of operation, as stated above. The resultant vehicle has the capacity to operate as a fully efficient wing-in-ground effect vehicle or aircraft, to take off from and land on any suitably hard surface, to take off and land on water and to operate efficiently as a high speed waterborne vehicle. The advantages of a vehicle of this nature will be self evident.

Because of the integrity of the vehicle described and depicted in the parent specifications it is possible to construct a waterborne air cushion vehicle that is extremely light and efficient and because of this and the other features that are the subject of the present specification it is further possible to construct a vehicle that will operate in all three modes of operation as mentioned above.

Normally any waterborne vehicle is of necessity heavily constructed in order to accommodate the stresses involved. Because of the unique type of air cushion suspension of the vehicle described in the parent specifications the stresses normally encountered by a waterborne vehicle are minimised, so allowing for a very light structure. This coupled with the other advantages described hereinafter allows the operation of a vehicle of this nature to be extended to the airborne mode. More particularly, the features described in the present specification allow the vehicle to operate efficiently in that mode.

It is a further object of this invention to enhance the efficiency of an airborne vehicle by propagating the wing-in-ground effect.

When entering the airborne mode from the waterborne mode the unique type of air cushion suspension facilitates quick and easy take off.

In accordance with the present invention, therefore, a wing-in-ground effect air-cushion vehicle comprises, in combination, a flat, rigid platform; a plurality of rigid walls attached substantially at right angles thereto and depending therefrom; a plurality of longitudinally-spaced, laterally-aligned arrays of flexible trough-shaped skirts, fastened via each longitudinal edge thereof with respect to the underside of said platform; a source of pressurized air admissable via apertures to the interiors of said skirts and, at a relatively lower pressure, to a plurality of open-bottomed air cushion chambers each bounded by an adjacent pair of said walls and by an adjacent pair of said skirts; and means for propelling said vehicle: characterized in that the vertical dimension of each said flexible trough-shaped skirt is adjustable by remote-control means while the vehicle is operating; the construction of the said vehicle being such that it is able to function as a waterborne vehicle, a wing-in-ground effect vehicle and an aerodynamic aircraft.

BRIEF DESCRIPTION OF THE DRAWINGS

In order that the reader may gain a better understanding of the present invention, hereinafter will be described several preferred embodiments thereof, by way of example only, and with reference to the accompanying drawings in which.

DETAILED DESCRIPTION OF THE PREFERRED EMBODIMENTS

Throughout the drawings, like integers will be referred to by the same numeral.

Figure 1:
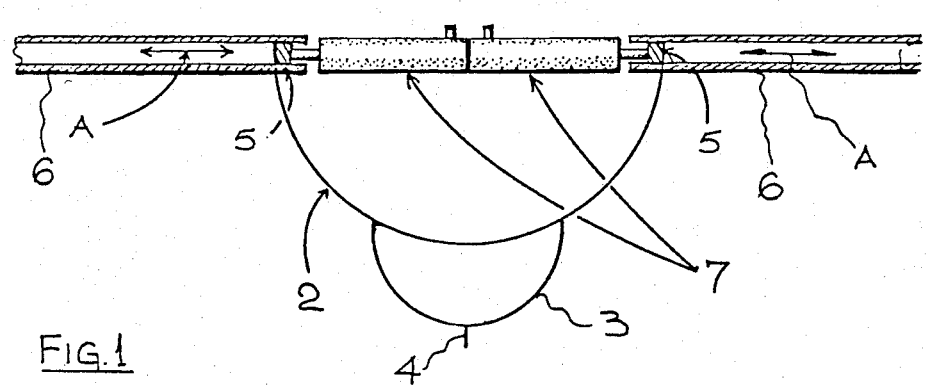
FIG. 1 is a cross-section through a flexible trough-shaped skirt, shows a first manner of vertical adjustment.

FIG. 1 shows a flexible trough-shaped skirt 2 substantially as previously described in the parent specifications and having a smaller part 3 and a flap 4 extending the length of the skirt. Each longitudinal edge of skirt 2 is attached, not directly to the underside of the sandwich-construction platform, as in the prior art, but to a skirt bar 5. Skirt bars 5 are adapted to slide sidewise on rails, rods or in skirt bar guides or channels 6 which are parallel to the fore-and-aft axis of the vehicle and affixed, as by bolting or bonding or by any other suitable means, to the sandwich construction and/or walls 1. Skirt bars 5 are enabled to be moved in the directions indicated 'A' parallel to the fore-and-aft line and may well be actuable by remotely-controllable means, either mechanically or hydraulically, as via hydraulic cylinder/ram assemblies 7. Movement of one or both skirt bars 5 will alter the fore-and-aft dimension of the skirt 2 and thus the skirt's vertical dimension. A suitable seal or seals would be provided to allow for the operation of the skirt bar 5 and stop the loss of air from the skirt 2 into the air cushion through any gap between the skirt bar 5 and the sandwich construction and/or rigid walls. This seal may comprise one or more simple flexible flaps in sealed attachment to the skirt bar 5 and of sufficient dimensions to rest against the sandwich construction and/or rigid walls, or may be any other suitably elastic material such as sealed cell rubber or plastic foam.

In a minor variation, sliding skirt bar 5 may be attached to the moving ram of one or more remotely controlled hydraulic cylinders 7, which in turn are fixed to the sandwich construction and/or rigid walls, the moving ram being sufficiently supported by runners and/or slide-through bearings (which are fixed to the sandwich construction and/or rigid walls) to stop the moving ram's deflection away from the sandwich construction under the influence of skirt load. In this case the aforesaid rails, channels or rods may or may not be present as the skirt bar 5 could be fully supported by the moving rams of the hydraulic cylinders 7.

Figure 2:
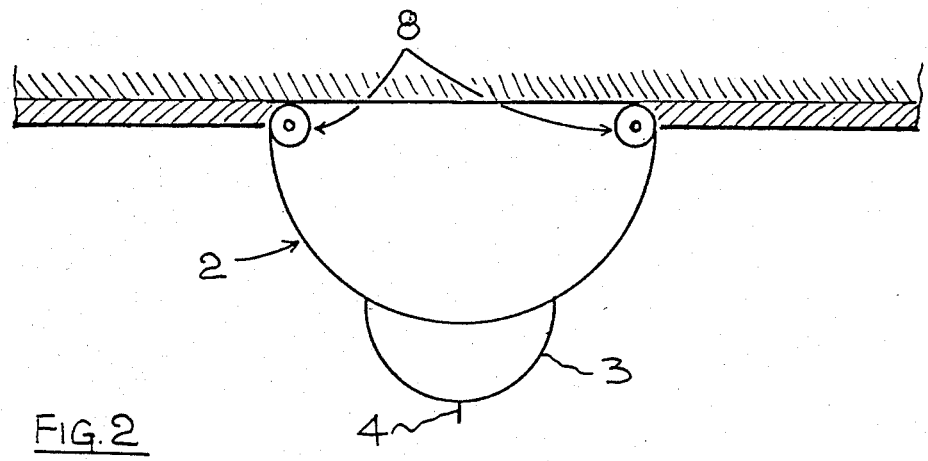
FIG. 2 is similar to FIG. 1 but shows a second manner of vertical adjustment.

FIG. 2 shows the skirt arrangement 2,3,4 having its longitudinal edges attached to skirt rollers 8 adapted to rotate in bearings fixed in or to the sandwich construction and/or rigid side walls and caused to rotate by a remotely controlled mechanical and/or hydraulic device. In this case the skirt 2 may be attached to the skirt roller 8 in a similar fashion to its attachment to the sliding skirt bar 5 and could simply be rolled onto or off the skirt roller 8 thus increasing or decreasing the skirt's vertical dimension. A suitable seal or seals similar to the aforesaid seals would be provided to allow for the operation of the skirt roller 8 and to stop the loss of air from the skirt into the air cushion through any gap between the skirt roller and the sandwich construction and/or rigid walls. In this case of course the seals would by preference be attached to the sandwich construction and/or rigid walls and not to the rotating skirt roller 8.

In a modification (not shown), the skirts 2 may be fully retracted by introducing a partial vacuum into the ducting supplying air to the skirts and air cushions. In this case the remotely controlled cut-offs in the air cushion inlets described in parent U.S. Pat. No. 4,227,475 would need to be closed, or if separate ducts are used the partial vacuum would be introduced only into the ducts supplying the skirts. This of course would suck the skirts back against the sandwich construction, or if the skirt inlets were of sufficient size, back into the sandwich construction. A partial reduction of the skirt's vertical dimension could be accomplished by introducing the vacuum only to selected segments of the skirt, thereby deflating only part of the skirt and causing a corresponding reduction in its vertical dimension. A separate blower with the inlet side of the blower connected to the ducting could be used to supply the partial vacuum, with the necessary isolation cut-offs, or a simple series of cut-offs installed in a double ducting system around the main blower wherein the normal air supply inlet outlet is reversed, or cut off and a reversed inlet outlet opened.

Figure 3:
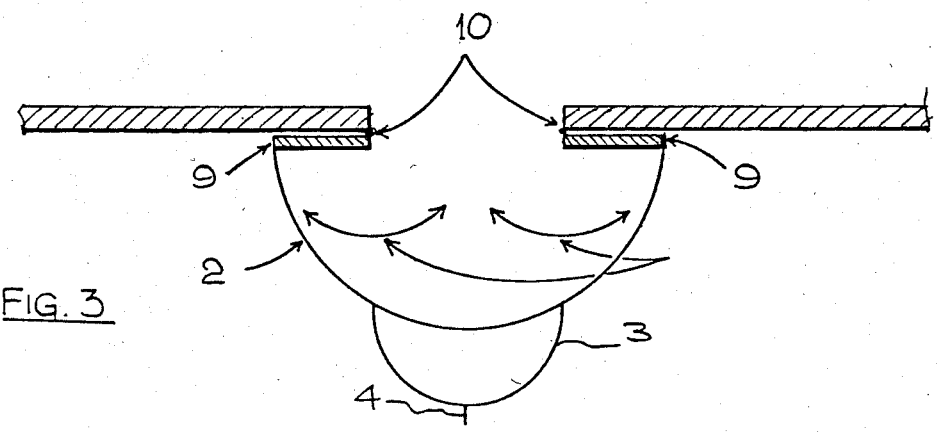
FIG. 3 is similar to FIGS. 1 and 2 but shows a third manner of vertical adjustment.

FIG. 3 shows the skirt arrangement 2,3,4 having its longitudinal edges attached to the outer, free margins of a pair of rigid, rectangular flaps or doors 9 laterally aligned and hingedly attached, as at 10, along one lengthwise edge or face, to the sandwich construction or attached along one lengthwise edge or face to, or integrally constructed with, a shaft that is laterally aligned (with respect to the vehicle) and may be caused to swing in bearings fixed in or to the sandwich construction and/or rigid walls. A recess is formed in the sandwich or support construction of suitable size to accommodate the retracted skirt, the rotating shaft and/or hinged attachment means of the said rigid door or flap 9, and the rigid door or flap itself. The skirt 2 is attached along its normal line of attachment, to the lengthwise face of the rigid flaps or doors 9. The rigid flaps or doors 9 may be caused to swing in the direction indicated by arrows B by any suitable remotely controlled hydraulic and/or electrical and/or mechanical means, such as the hydraulic cylinders 7 of FIG. 1, so that when closed they cover the recess in the sandwich construction with the length-wise edges, adjacent to where the skirt is attached, touching or nearly touching. With the rigid flaps or doors 9 nearly open the skirt 2 is in its operational position, and by partly opening or closing the doors the skirt's vertical dimension is decreased or increased. To retract the skirts 2 a partial vacuum is first introduced into the skirt ducting as aforesaid so as to retract the skirt back into the recess, and the doors 9 are then closed and the vacuum turned off. A suitable seal similar to that incorporated in the aforesaid skirt roller 8 would be employed to stop any loss of air between the shaft and/or hinged attachment of rigid flap or door 9 and the sandwich construction and/or rigid walls.

Figure 4:
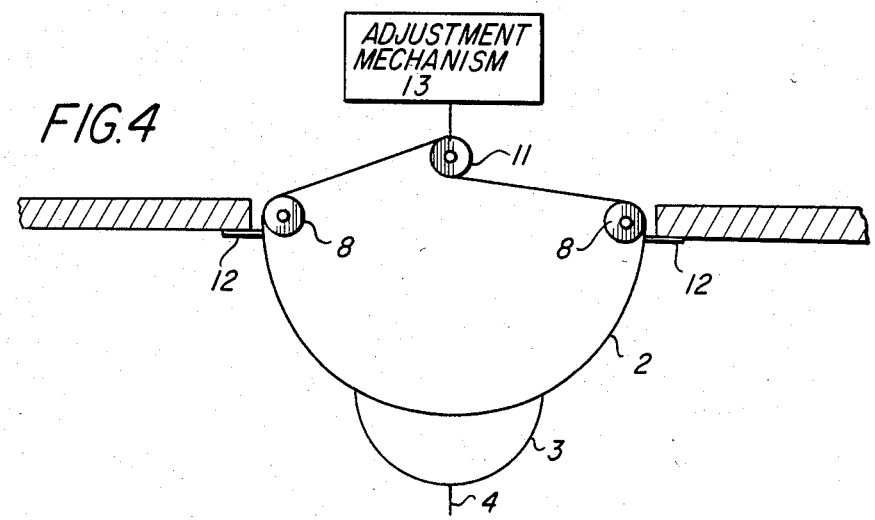
FIG. 4 is similar to FIGS. 1, 2 and 3 but shows a fourth manner of vertical adjustment.

FIG. 4 shows the skirt arrangement 2,3,4 with skirt 2 extended somewhat so that it extends around rollers 8, one longitudinal edge being attached to the top of a central roller 11 and one longitudinal edge attached to the bottom of roller 11. Rollers 8 and 11 are adapted to rotate in any number of bearings fixed in or to the sandwich construction and or rigid walls, rollers 8 and/or 11 being caused to rotate by any suitable remotely controlled mechanical and/or hydraulic device such as adjustment mechanism 13. The skirt 2 may be attached to roller 11 in a similar fashion to its attachment to the sliding skirt bar 5 and could simply be rolled onto or off the roller. A similar seal to that described in the paragraph detailing FIG. 2 could be used or a simple protrusion 12, FIG. 4 (comprising any suitable material) could be formed on or near the edge of the bottom surface of the sandwich construction so that the outward pressure of the skirt 2 causes it to seal against the protrusion 12.

Figure 5:
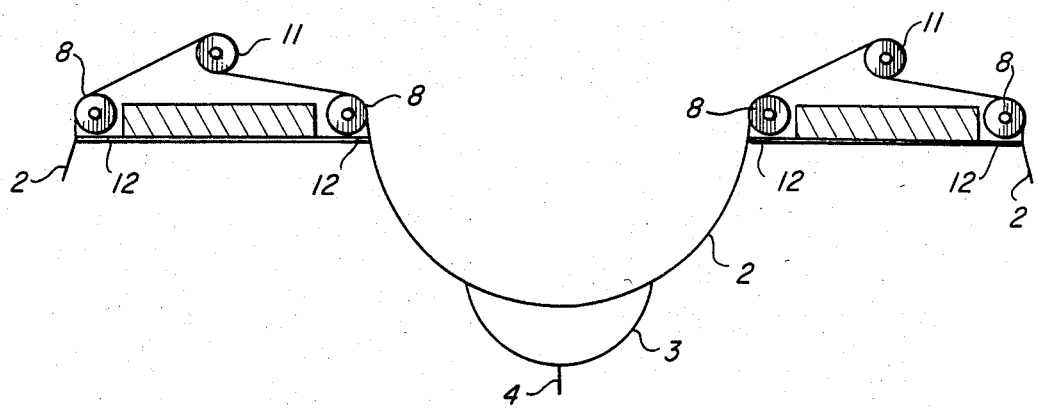
FIG. 5 is similar to FIGS. 1, 2, 3 and 4 but shows a fifth manner of vertical adjustment.

FIG. 5 shows a skirt arrangement 2,3,4 very similar to that depicted in FIG. 4 except that the skirt 2 passes around rollers 8 on the opposite side and each roller 8 controls one side of one skirt and one side of the adjacent skirt. The longitudinal edges of the skirts 2 again are attached one to the top of roller 11 and one to the bottom of roller 8 in the fashion described earlier. Again the skirt is simply rolled on or off roller 11. A seal 12 or similar seals to those described earlier could be employed to prevent the loss of air from the duct into the air cushion.

Figure 6:
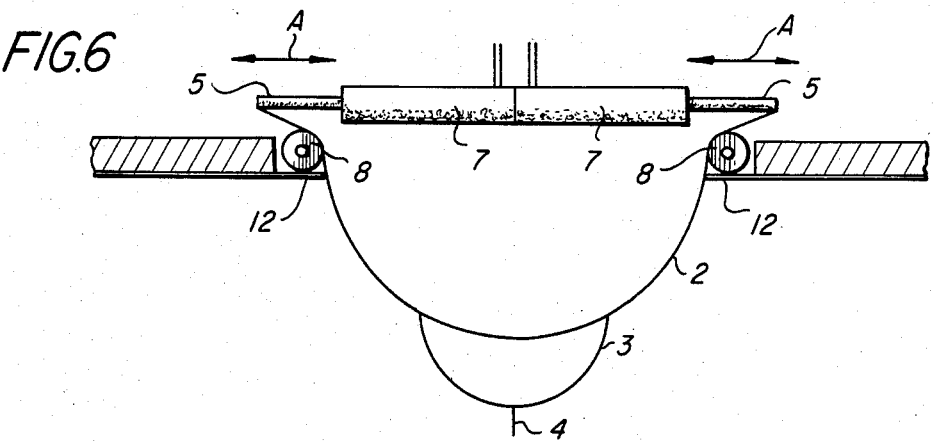
FIG. 6 is yet a further manner of vertical adjustment.

FIG. 6 shows the skirt arrangement 2,3,4 with the skirt bars 5 attached to the moving rams of the hydraulic cylinders 7 in a similar fashion to that shown in FIG. 1, the skirt 2 passing over rollers 8 (skirt bars 5 can move in the direction indicated A) so that when the hydraulic cylinders are extended the skirt's vertical dimension is decreased and when they are retracted the skirt's vertical dimension is increased. The hydraulic cylinders 7 may be fixed in or to the sandwich construction and/or rigid walls, the rollers 8 being adapted to rotate in any number of bearings fixed in or to the sandwich construction described in FIG. 1, and a protruding seal 12 could be incorporated or similar sealing methods to those described in FIG. 4 could be employed.

As will be appreciated, adjustment of the flexible trough-shaped skirts' vertical dimension allows the vehicle to be run up onto a beach, say, when the lowest point of the skirts would require to be level with the bottom of the sidewalls. This adjustment feature also allows the skirts to be adjusted to the most suitable dimension during take-off and fully retracted when airborne, this being necessary to the operation of the vehicle in the airborne mode. In any of the aforesaid methods of skirt retraction suitable recesses in the sandwich construction could be formed so as to permit the skirts to be fully retracted into said sandwich construction.

The vehicle may be of split type, flat or aerodynamic construction whereby the rigid walls, skirt bars and rollers and any other necessary structural features may be one structural unit capable of being retracted by any remotely-controllable mechanical and/or hydraulic means into the top of the sandwich construction, which is suitably formed to received such structure, any necessary remotely-controllable covers being provided to cover the retracted skirts and/or mechanisms. Retractable or fixed wheels and/or skis could be incorporated in any suitable part of the vehicle to allow the vehicle to land on any sufficiently hard surface. These may be remotely controlled by mechanical and/or hydraulic means, and/or manually controlled.

In a particular embodiment of the above split-type sandwich construction each skirt and its adjacent rigid walls could be one structural unit capable of being retracted individually of the adjacent skirt and associated rigid walls. This segmented type of construction could be retracted into the same type of upper construction mentioned above by any suitably remotely controlled mechanical and/or hydraulic device. A simple flap type or other seal could be used to prevent any loss of air between the segments.

In another embodiment the vertical dimension of the front, rear and central skirts may be less than that of any other skirts on the vehicle. This both allows the vehicle to plane more easily and permits easier induction of air under the leading skirts to break the surface contact with water and so facilitate a quicker take-off.

The rigid sidewalls may be arranged to fold out or in or retract. This may be accomplished by pivotally folding them or retracting them into the sandwich construction, and either system could be actuated mechanically and/or hydraulically. This of course would be advantageous when the vehicle was airborne and out of its wing-in-ground effect mode.

In a modification the rigid walls may be provided with means to reduce the surface friction between them and the water. This may well be accomplished by air lubrication, wherein air may be ducted from the air supply ducts and/or a separate source to the lower portion of the rigid walls and allowed to escape through small holes and/or slots in the wetted wall surfaces. Another method would be to supply sufficient small irregularities in the wetted rigid wall surface to induce air entrainment and thus supply air lubrication. These irregularities could take the form of slightly raised ridges and or flat-topped cylindrical or square protrusions in the wetted wall surfaces.

These irregularities could also take the form of small recesses of any shape, such as elongate, round or square holes with or without access via conduits or other means to air at atmospheric or higher pressure, the said recesses being positioned so that the movement of the wall through water inducts air through the said conduit and entrains it along the wetted wall surface. This modification increases the efficiency of the vehicle at high speed and facilitates easier take-off.

Figure 7:
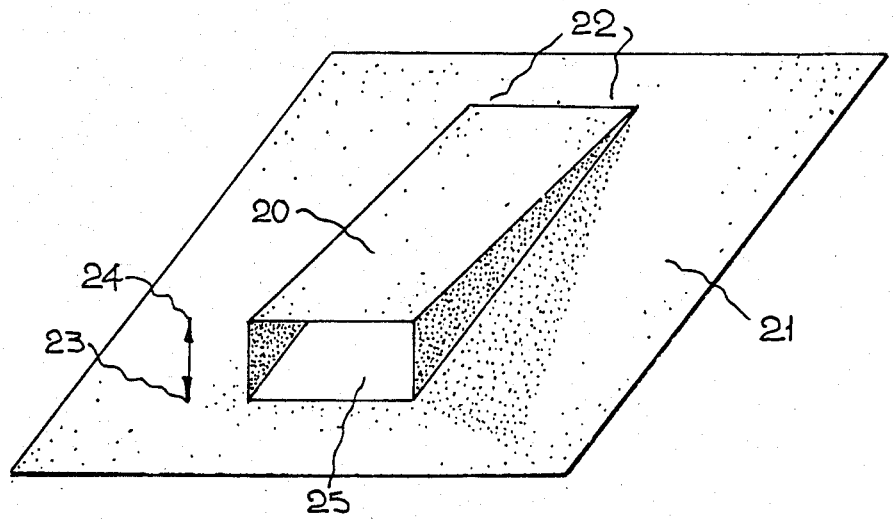
FIG. 7 is an isometric view of an air scoop.

In a further modification one or more door, scoop, flap or bell type remotely controlled air-scoops with the opening facing forwards may be located anywhere on the vehicle, and one such is shown in FIG. 7, in which a scoop casing 20 is provided on a surface 21 of the vehicle. Scoop casing 20 is hinged to surface 21 at 22 so as to be able to assume either a closed position, referenced 23, or an open position, referenced 24, which provides an air inlet/outlet port 25.

Figure 11:
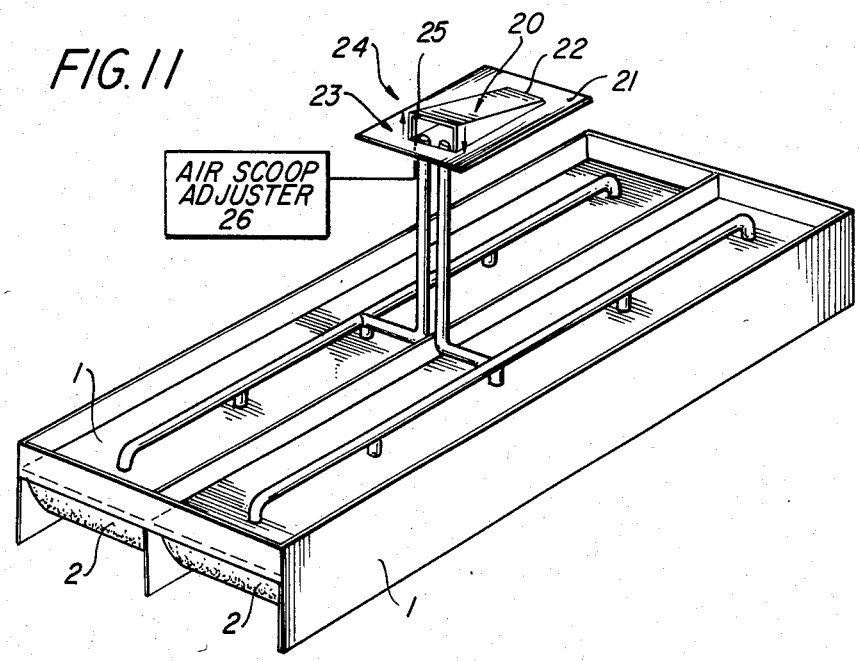
FIG. 11 is a perspective view showing an air scoop and a typical distribution system.

As shown in FIG. 11, scoops 20 may be attached by ducting to the air cushion and/or skirt supply ducts and may be placed partially or wholly within the air propeller's slip stream. These air-scoops could be mechanically and/or hydraulically and/or manually opened or closed by air scoop adjuster 26 in order to augment or fully supply the air cushions and skirts when the vehicle was operating at speed. This would be advantageous during take-off and/or when the vehicle was operating at speed in the waterborne mode. In a reversal of this scoop the mouth could face aft, whereby the door, scoop, flap or bell is controlled and attached to the air cushion and/or skirt ducting as aforesaid and suitably aerodynamically shaped so as to supply the necessary vacuum required to retract the skirts when the vehicle is in the airborne mode. Suitable remotely-controllable cut-off and/or isolation gates would, of course, have to be supplied in the ducting and/or blower inlets in order to stop any loss of air through the blower when said blower is not operating, and the scoop is supplying a partial vacuum to the skirts or a pressure to the skirts and air-cushions.

Figure 12:
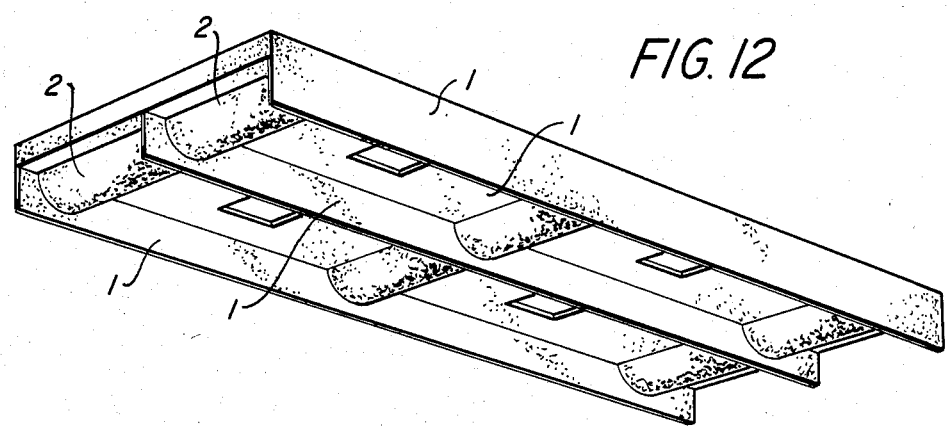
FIG. 12 is a bottom perspective view illustrating four open-bottomed air-cushion chambers.

FIG. 12 is a bottom perspective view illustrating an air-cushion vehicle having four open-bottomed air-cushion chambers each bounded by an adjacent pair of skirts 2 and an adjacent pair of walls 1.

In a further modification, part or all of the front of the vehicle could be designed so as to be an air-dam or scoop which, when the vehicle is operating at speed, effectively funnels the captured air under the front skirts. The rigid sidewalls would protrude sufficiently forward to restrict air spillage from the sides of the vehicle.

Figure 8:
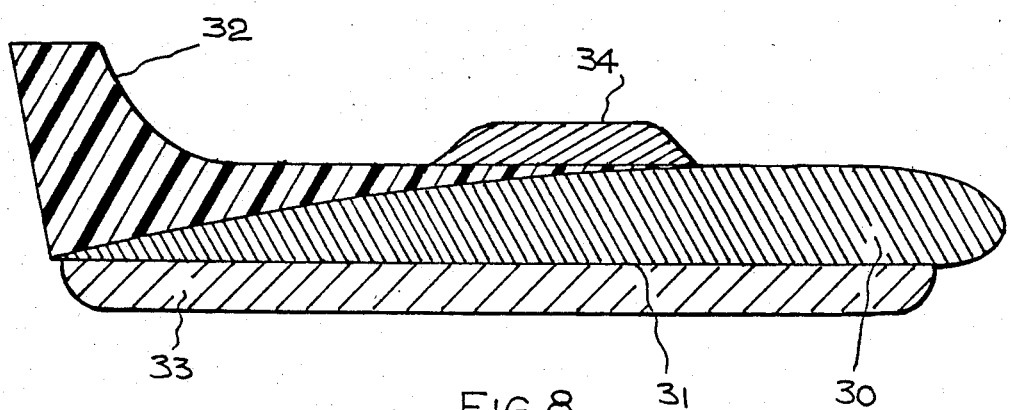
FIG. 8 is a longitudinal vertical sectional view of an aerodynamically formed sandwich construction showing also the rigid wall, tail assembly and cabin or cockpit.

FIG. 8 is a longitudinal vertical sectional view of an aerodynamically formed sandwich construction showing also the rigid wall, tail assembly, and cabin or cockpit 34.

As will be seen, the sandwich construction 30 is aerodynamically formed so as to have a chordal cross-section similar to that of an aircraft wing or aerofoil, the chord of which may be the same as or less than the length of the vehicle and exhibits a flat underside surface 31. At the aft end of the vehicle there may be provided one or more tailfins such as 32 to facilitate fully aerodynamic control of the vehicle when in the airborne mode.

Normal flap, aileron and rudder controls may be incorporated in both the tail and the rear of the main aerofoil section. The wing area may continue outside the main air cushion body of the vehicle and may be either anhedral or dihedral and of the delta, reversed delta or constant chord type, with or without aileroned dihedral or anhedral tips. Alternatively said aileroned dihedral or anhedral tips may be the only section of the wing protruding outside the main air cushion aerodynamic body. The sidewalls 33 enhance the operation of the vehicle when operating in the airborne wing-in-ground effect mode, and lateral stability is further promoted by the two or more channels formed by the three or more rigid walls giving in effect two or more ground effect air cushions.

In another embodiment the main body of the vehicle may be as described in U.S. Pat. No. 4,227,475, that is, flat, or as described above or aerodynamically formed in longitudinal vertical section so as to be the same or similar to an aircraft wing or aerofoil having a chord the same as or less than the length of the vehicle, aerodynamic lift being provided or augmented by laterally aligned anhedral or dihedral delta or other wings or aerofoils running across the vehicle above the sandwich type or aerodynamic construction, and attached to it by any number of aerodynamically shaped braced vertical or near vertical struts, and/or protruding from a fuselage type accommodation structure longitudinally aligned and integral with the sandwich construction. The wings may be pivotally attached and remotely controlled in order to change the angle of incidence or attack. Such a wing's pivotal attachment may take the form of a laterally (with respect to the vehicle) aligned shaft fixed in the wing and rotating in bearings in the structure supporting the wings, or alternatively the shaft may be fixed in the wing support structure, the wing rotating on the shaft using bearings fixed in the wing. One or more 'T' or other type tail sections such as 32 in FIG. 8 may be provided at the rear of the fuselage and or sandwich structure, and both the wings and tails may have full aileron, flap and rudder controls.

Figure 9:
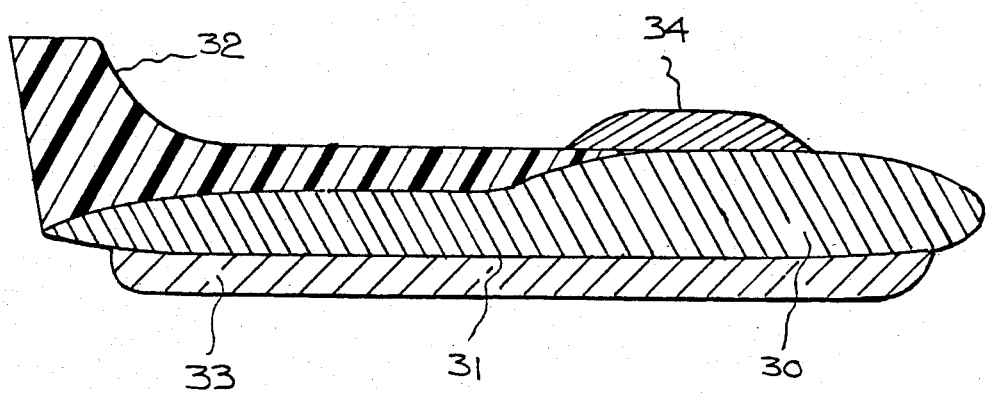
FIG. 9 is a sectional view of another type of aerodynamically formed sandwich construction.
Figure 10:
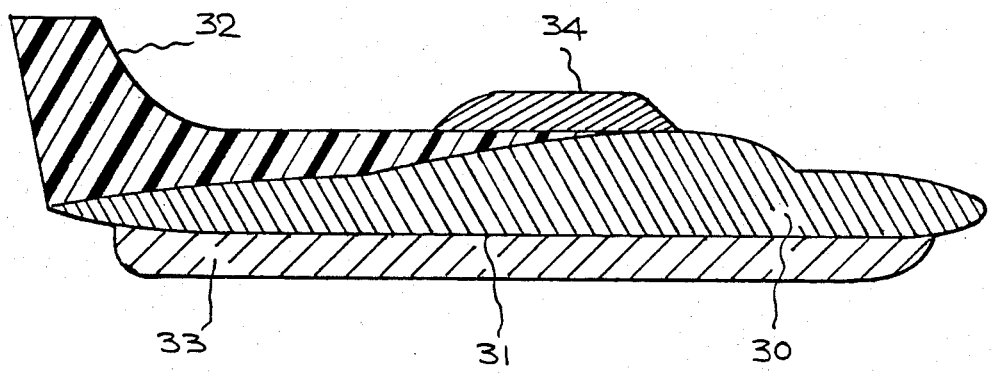
FIG. 10 is a sectional view of a further type of aerodynamically formed sandwich construction.

FIGS. 9 and 10 are sectional views of two or more types of aerodynamically formed in longitudinal vertical section sandwich constructions. In the embodiment shown in FIG. 9 the aerodynamically formed section of the sandwich construction 30 may have a chord less than the length of the vehicle. Further to this the length of the aerodynamically formed section of the underside surface 31 of the sandwich construction 30 may be different to the length of the aerodynamically formed topside surface. Any number of these aerodynamically formed sections maybe disposed in any position on the length of the vehicle. Another possible position is depicted in FIG. 10 wherein 30 is the aerodynamically formed sandwich construction, 31 is the underside surface of the sandwich construction, 32 is the tail, 33 is the rigid wall, and 34 is the cabin or cockpit.

In a further modification any number of dihedral or anhedral wings may extend from the wing-type or flat sandwich construction and/or the longitudinally aligned fuselage and may be pivotally attached as aforesaid and remotely-controllable in order to change the angle of incidence or attack of the wing. Furthermore these wings may be laterally aligned (with respect to the vehicle) with one towards the front of the vehicle and one or more further back, the front wing being of lesser or greater span and of lesser or greater height above or below the sandwich construction than the following wings.

In another embodiment of this type of wing configuration any wing or aerodynamic wing-type sandwich construction mentioned in this specification may have another subsidiary wing with or without flat or concave in cross-section topside surface and/or underside surface and with or without any flap, rudder or aileron controls, this subsidiary wing being fixedly or pivotally attached (in order to change its angle of incidence or attack) in any position around the main wing. In a particular embodiment this subsidiary wing may be below and behind the main wing.

All wings may be provided with flaps, ailerons and dihedral or anhedral aileroned tips and may be of any configuration.

In any of the wings and/or aerodynamically formed in longitudinal vertical section sandwich type constructions referred to in this specification the underside (see reference 31 of FIG. 8) and/or topside may be flat in cross-section and/or the wings may be mechanically or otherwise retractable in order to fold away or otherwise retract partially or fully into the main body of the vehicle and/or fuselage when not in use.

In a further modification the wings may be of the flexible membrane type and may be dihedral or anhedral of delta, reversed delta or other shape, retained where necessary to form an aerodynamic wing shape similar to that employed in hang-gliders, their leading edge being attached to a rigid arm which may fold or otherwise retract by mechanical remote control or otherwise into the main body of the vehicle and/or fuselage.

In a further modification a flexible type wing may well incorporate a rigid arm leading edge suitably aerodynamically shaped and pivotally attached in order to form the leading edge of a fold-back wing, and also a similar arm suitably aerodynamically shaped and pivotally attached in order to form the trailing edge of a fold-back wing, with suitably reinforced flexible membranes in sealed attachment to the leading and/or trailing arms to form the upper and lower wing surfaces, together with a plurality of suitably shaped rigid and/or flexible membrane, vertical lateral frames, which may be fixed to the flexible membrane and/or pivotally or fixedly attached to the rigid leading and trailing arms, to facilitate its fold-back capacity and to maintain the wing shape. Further to this, compressed air or other gas may be introduced into the sealed wing to inflate the outer membrane in order to retain the aerodynamic shape.

In a further modification an inflatable enclosure may be formed by the sealed attachment of a flexible membrane, covering folding or retractable flexible or rigid frames (suitably attached to the flexible membrane and/or supporting structure) to any suitable portion of the vehicle in order to supply the necessary aerodynamic shape to promote lift or for any other purpose.

In a further modification any number of the aforesaid wings with underside and/or topside flat in cross-section may be disposed in twos or threes similar to a bi-plane or tri-plane. In a particular embodiment of this type of wing structure the lower wing may have a flat-in-cross-section upper surface and the upper wing may have a flat-in-cross-section lower surface in the case of the two wings. In the case of three wings the upper and lower wings could be as mentioned above and the central wing may be a flat sheet suitably braced to the other two wings with aerodynamically shaped struts. Any number of these wings with flat-in-cross-section upper and/or lower surfaces may be used in any configuration.

In any of the configurations incorporating the said sandwich construction or aerodynamically wing shaped in longitudinal vertical section sandwich construction mentioned in this specification, the said sandwich construction or aerodynamic sandwich construction may be of any sutable configuration in order to supply the necessary strength and aerodynamic wing or aerofoil shape and/or may be circular in plan.

Any suitable power source may be used for propulsive and other power, depending on the proposed use of the vehicle. A turbo-charged or naturally aspirated diesel engine may drive, through hydro-static transmissions, one or more retractable and/or fold-back directional water propellers, one or more full feathering air propellers and one or more centrifugal and/or axial type blowers. In this configuration the water propellers and/or the air propellers could be used for propulsive power when the vehicle is in the waterborne air cushion mode. The 'T' or other type tail, such as 32 in FIG. 8, is used in conjunction with the rudder for steerage when the air propellers are in use; this being of advantage when it is required to run the vehicle up onto a beach when, of course, the water propellers could not be used. The combined propulsive power of the water propellers and air propellers could be used to facilitate easier and quicker take-off when entering the airborne mode, the fold-back capacity of the drive leg of the water propeller allowing it to deflect back over floating obstacles, to become inoperable without causing excessive drag when the speed of the vehicle exceeds that of the water propeller's propulsive thrust during take-off, and to fully fold back when the vehicle is in the airborne mode.

A further device incorporated in the fold-back directional water propeller leg automatically cuts off or restricts the power flow to the water propeller when the leg has folded back past a certain point. This could be a simple cut-off valve which effectively reduces, proportionally to the amount of fold-back of the leg, or fully stops, the flow of hydraulic oil to the hydraulic motor powering the water propeller when the leg has folded back past said point.

In a further embodiment power may be supplied by any suitable source such as marine gas turbines with shafted or hydraulic drives to the various propellers and blowers, or turbo-fan, piston driven propeller or jet propulsion may be used. These motors may be mounted anywhere suitable on the vehicle, tail, wings, fuselage, sandwich construction or on a forward extension of the fuselage and/or forward extensions of parts of the sandwich construction. Furthermore any of these engines may be pivotally mounted in order to supply a backward and downward thrust in order to facilitate easier and quicker take-off.

In any of the above configurations the aforesaid fuselage may be a separate, cylindrical or other suitable aerodynamically-shaped structure attached to the main flat or aerodynamically-shaped sandwich construction by aerodynamically-shaped struts and/or rigid longitudinal walls.

In a further modification rigid walls of a similar type to those protruding below the sandwich construction may protrude above said sandwich construction and may be incorporated in any of the configurations of the vehicle described in this specification, and may act as support structures for the wings and the like.

In a particular embodiment, the vehicle may have a flat or aerodynamic wing shaped in longitudinal vertical section sandwich construction as aforesaid with longitudinally oriented vertical rigid walls, with one or more structures of similar shape and the same or smaller or larger dimensions placed above it and affixed to the lower structure by means of a longitudinal fuselage and/or aerodynamic struts and/or rigid wall which are parallel and similar to the rigid walls of the lower structure. The longitudinal fuselage and/or the rigid walls may protrude above the upper wing type structure. Any of the wing type structures may have upper and/or lower surfaces that are flat in longitudinal vertical section.

In any one of the aforesaid skirt retraction and/or vertical dimension adjustment means, suitable recesses in the sandwich construction or support structure may be allowed to accommodate the necessary mechanism in order that this does not protrude below the adjacent surfaces. Further to this, suitable sliding or other remotely-controllable covers may be incorporated in, or separately supplied, in order to cover the said skirt adjustment mechanisms and/or the retracted skirts.

From the abovegoing, the reader will readily appreciate the wing-in-ground effect air-cushion vehicles built according to the present invention provide the public with a new or much improved means of transport or, at the very least, offer to it a useful and most attractive choice.

The claims defining the invention are as follows,

I claim:

1. In an air-cushion vehicle of the kind having a flat, rigid platform; a plurality of flat, rigid longitudinal walls attached substantially at right-angles thereto and depending therefrom substantially parallel with the major axis of said platform, an outermost two of said rigid walls being disposed as sidewalls along the respective outer edges of said platform; a plurality of longitudinally-spaced, laterally-aligned arrays of flexible trough-shaped skirts respectively looped with a space therein and fastened via each longitudinal edge thereof with respect to the underside of said platform; a source of pressurized air, said air being admissable, via apertures of fixed size at a relatively high pressure, to said skirts and also being admissable at a relatively lower pressure, via variable-sized openings, to at least four open-bottomed air-cushion chambers each bounded by an adjacent pair of said skirts and by an adjacent pair of said walls;

a remotely-controllable adjustment mechanism capable of varying the vertical dimension of each said flexible trough-shaped skirt, said vertical dimension adjustment mechanism comprising a skirt bar attached to each longitudinal edge of said skirt and adapted to be slid sideways, in a skirt bar guide, in a direction parallel with the major axis of said vehicle so as to vary the fore-and-aft dimension of said skirt and thus the skirt's vertical dimension.

2. A vehicle as claimed in claim 1, wherein there is provided a plurality of remotely-controllable air scoops on the surface of said vehicle, said air scoops facing forwardly and being in communication with said flexible, trough-shaped skirts and with said air-cushion chambers.

3. A vehicle as claimed in claim 1, wherein there is provided a plurality of remotely-controllable scoops on the surface of said vehicle, said scoops facing backwardly and being in communication with said flexible, trough-shaped skirts so as to supply the latter with a partial vacuum.

4. A vehicle as claimed in claim 1, being aerodynamically contoured so as to include at least one longitudinal cross-section of aerofoil section.

5. In an air-cushion vehicle of the kind having a flat, rigid platform; a plurality of flat, rigid longitudinal walls attached substantially at right-angles thereto and depending therefrom substantially parallel with the major axis of said platform, an outermost two of said rigid walls being disposed as sidewalls along the respective outer edges of said platform; a plurality of longitudinally-spaced, laterally-aligned arrays of flexible trough-shaped skirts respectively looped with a space therein and fastened via each longitudinal edge thereof with respect to the underside of said platform; a source of pressurized air, said air being admissable, via apertures of fixed size at a relatively high pressure, to said skirts and also being admissable at a relatively lower pressure, via variable-sized openings, to at least four open-bottomed air-cushion chambers each bounded by an adjacent pair of said skirts and by an adjacent pair of said walls;

a remotely-controllable adjustment mechanism capable of varying the vertical dimension of each said flexible trough-shaped skirt, said vertical dimension adjustment mechanism comprising a pair of spaced-apart skirt rollers about which said skirt extends, one longitudinal edge of said skirt being attached to the top of a centrally-disposed roller and the other longitudinal edge being attached to the bottom of said centrally-disposed rollers, the said centrally-disposed roller being rotatable to wind or unwind thereabout the margins of said skirt so as to vary the skirt's vertical dimension.

* * * * *